June 12, 1934.  W. M. PATERSON  1,962,522
PIPE SWAGING CLAMP
Filed April 19, 1933
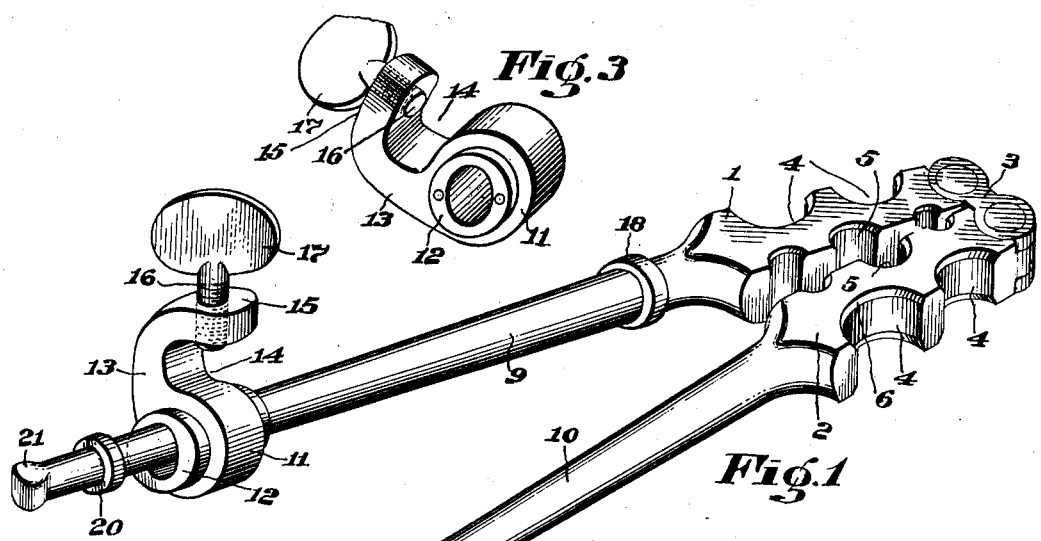
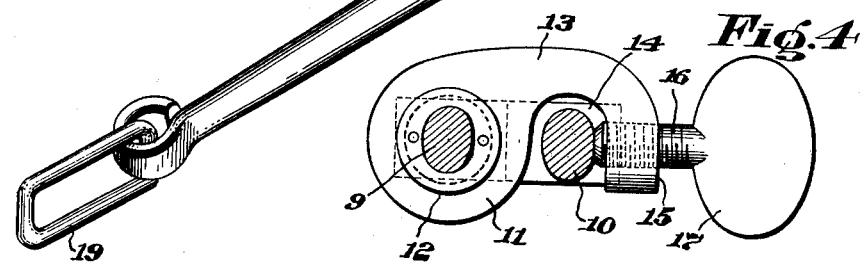
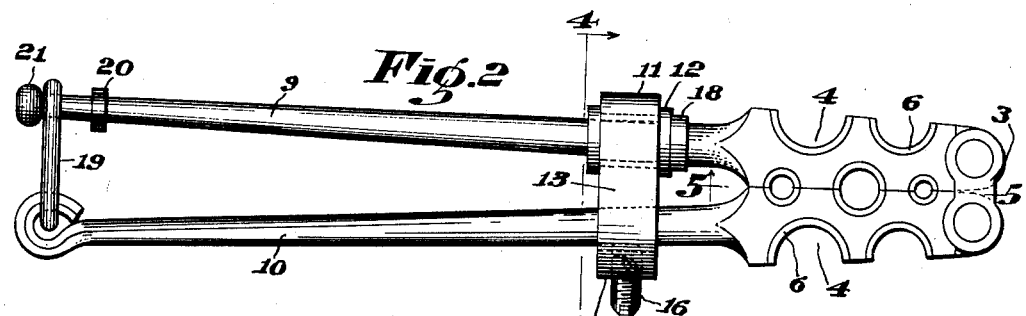
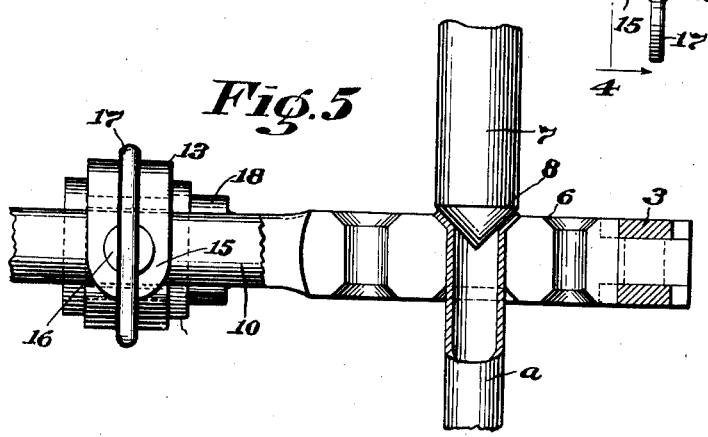
INVENTOR
Wilmot M. Paterson
BY
Robt. G. Hains
ATTORNEY Patented June 12, 1934

1,962,522

UNITED STATES PATENT OFFICE 1,962,522

PIPE SWAGING CLAMP

Wilmot M. Paterson, Wellesley, Mass., assignor to Trimont Manufacturing Co. Inc., Roxbury, Mass., a corporation of Massachusetts Application April 19, 1933, Serial No. 666,854

2 Claims. (Cl. 153—79)

This invention relates to pipe swaging clamps and is more particularly directed to clamps of this general nature wherein handles are provided on the jaw portions of the clamp for manipulating the jaws.

Where the end of a pipe is to be swaged or outwardly flared it is now the common practice to provide clamp complemental pipe engaging recesses or die portions and to securely hold the pipe by the clamping action of the jaws when the end of the pipe is subjected to a blow upon the swaging tool.

Where the pipe swaging clamp is of the so-called handle type difficulty has been experienced in holding the pipe in the clamp with sufficient force to withstand the action of the swaging tool and one of the important features of the present invention consists in providing a jaw setting device associated with the handle or handles of the jaws so that when the pipe has been placed between the jaws the setting device may act energetically to force the jaws into such intimate contact with the pipe as that the latter may not be displaced when the swaging tool is brought into action.

In accordance with the present invention the swaging clamp is of the hand manipulated type, that is each jaw is provided with a handle so that they may be readily brought into position upon a pipe or tube to be swaged, and means are provided on at least one of the handles to force the two jaws into close clamping contact with the pipe after it has been placed in the recesses between the jaws. More particularly stated, the jaw setting device is mounted on one of the handles connected to one of the jaws and is movable longitudinally thereof and also about the handle and the setting device is provided with an open goose neck which may be moved into engagement with the opposite handle when the setting device has been placed longitudinally of its handle adjacent to the clamping jaws, and means are further provided to act through the overhanging arm of the goose neck to draw the two jaws into close clamping engagement with the pipe.

The invention and novel features thereof will best be made clear from the following description and accompanying drawing of one good form thereof.

In the drawing:—

Fig. 1 is a perspective view of a pipe swaging clamp containing the present invention and with the jaws separated in position to receive a pipe;

Fig. 2 is a top or plan view showing the jaws closed upon a pipe and the jaw setting device in operative position to act energetically upon the jaws;

Fig. 3 is a detached detail of the jaw setting device;

Fig. 4 is a section on the line 4—4 of Fig. 2; and

Fig. 5 is an enlarged section on the line 5—5 of Fig. 2.

The pipe clamping jaws may be variously contrived, but as shown in the present instance the jaws 1 and 2 are pivotally connected together by a link 3 and each jaw has a series of die or recessed portions which are complemental to each other in the two jaws, so that when the jaws are brought together by movement of the handles and into engaging relation with the pipe the die portions or recesses in the jaws will engage the pipe.

In the present instance of the invention each jaw 1 and 2 is provided with a series of die portions or recesses 4 on one face and a series of recesses 5 on their opposite faces, it being understood, of course, that the recesses 4 in each jaw and the recesses 5 in each jaw are complemental to each other.

Insomuch as the pipe to be swaged is to have its end portion flared outwardly each of the recesses 4 and 5 is provided with a substantial outwardly flared conical portion 6, the result being that when a pipe is submitted to the action of the swaging tool the end portion of the pipe will be flared outwardly into the conical recesses 6. This is best shown in Fig. 5 where a pipe a is illustrated as being swaged by a swaging tool 7, the conical end portion 8 of which is seated within the pipe opening and then given a swaging blow.

Each of the jaws 1 and 2 is provided with a handle 9 and 10 whereby convenient means is provided for manipulating the jaws and placing them into operative engagement with a pipe to be swaged.

Mounted upon one of the handles, 9 in the present instance, is the jaw setting device which comprises a sleeve portion 11 preferably mounted upon a bushing 12 and movable longitudinally of the handle 9.

The sleeve portion 11 has an upwardly extending arm 13 formed as an open goose neck; that is, the opening 14 constitutes a portion or goose neck adapted to engage about the opposite handle 10 when the jaw setting device is rotated upon its handle 9. This condition is well shown in Fig. 4 wherein the handle 10 is shown in section as engaged within the goose neck opening 14 by reason of having the jaw setting device turned about the longitudinal axis of the handle 9 when the setting device has been moved into a position adjacent the clamping jaws.

Threaded in the overhanging arm 15 of the jaw setting device is a binding member 16, constituted in the present instance of the invention as a screw threaded into the overhanging arm 15 and readily manipulated by a wing piece 17.

It is desirable that the jaw setting device shall perform its jaw setting function close to or adjacent the clamping jaws and consequently when a pipe has been placed between the jaws, the jaw setting device is moved longitudinally of its handle 9 and in order to limit its movement into correct operative position a stop 18 is formed on the handle 9 closely adjacent to the jaw 1. As shown the stop 18 is formed as a collar secured to the handle 9, and when the jaw setting device has been moved into its proper jaw setting position, indicated by the stop 18, it may be turned about the handle 9 to engage the opposite handle 10 in the recess 14 of the goose neck, whereupon by manipulation of the screw 16 the two jaws will be forced into close clamping relation with a pipe that has been placed in the complemental recesses of the two jaws for swaging purposes.

When a pipe is presented to the jaws for a swaging action the jaws, of course, will be separated, as indicated in Fig. 1 and then closed upon each other by hand pressure. At this time it may be desirable to properly locate the pipe to be swaged in the dies or recesses of the jaws so that the right amount of the pipe will be submitted to the action of the swaging tool 7 before the swaging operation.

This is effected in the present instance of the invention by providing a link 19 which may be hung upon one of the jaws, 10 in the present instance, and as indicated in Fig. 2, the loop portion of the link can be engaged with the opposite handle 9, with the result that while the pipe is held in the clamp it is not held so tight but that it may be subjected to longitudinal displacement by a slight force. When the pipe has been finally located the jaw setting device is moved longitudinally of the handle 9 into contact with the stop 18 whereupon the jaw setting device is turned to engage the opposite handle in the recess 14 of the goose neck and the screw 16 is then actuated to bring the jaws into forceful clamping action upon the pipe for the swaging operation.

It may be desirable to provide a stop 20 near the outer end of the handle on which the jaw setting device is mounted, but this may not be necessary as the enlargement 21 may be sufficient to confine the jaw setting device on the handle.

What is claimed is:—

1. A pipe swaging clamp including two pivotally connected jaws having complemental die portions for receiving a pipe to be swaged, a handle extending from each jaw, a link pivoted to the end of one handle and engageable with the end of the other handle for holding the jaws in light clamping action upon a pipe between the jaws and a jaw setting device comprising a member mounted for movement longitudinally of and about one of said handles and having a recess to receive the opposite handle when the device is turned about its mounting, and a binding member to act upon said opposite handle when the jaw setting device has been moved into position adjacent the jaws for exerting a strong clamping pressure upon the pipe for the swaging operation and a stop for limiting longitudinal movement of the setting device towards the jaws.

2. In a pipe swaging clamp, the combination of two pivotally connected jaws having complemental recessed portions on their opposite faces for receiving a pipe to be swaged, a handle extending from each jaw, a link pivoted to the end of one handle and engageable with the end of the other handle for holding the jaws in light clamping action upon the pipe to be adjusted, a bushing mounted on one handle for movement towards and from the jaws a sleeve mounted on the bushing and for swinging movement about the handle, an arm extending from the sleeve and having an open goose neck to receive the opposite handle when the sleeve is turned about the handle on which it is mounted, and a set screw tapped into the overhanging portion of the goose neck to draw the jaws into strong clamping action upon the pipe to be swaged.

WILMOT M. PATERSON.